United States Patent [19]

Shelef

[11] Patent Number: 4,819,496
[45] Date of Patent: Apr. 11, 1989

[54] SIX DEGREES OF FREEDOM MICROMANIPULATOR

[75] Inventor: Gad Shelef, Palo Alto, Calif.

[73] Assignee: The United States of America as represented by the Secretary of the Air Force, Washington, D.C.

[21] Appl. No.: 121,493

[22] Filed: Nov. 17, 1987

[51] Int. Cl.$^4$ .................... B25J 17/02; G05G 11/00
[52] U.S. Cl. .................... 74/479; 74/89.15; 74/89.2; 901/21; 901/23; 901/29
[58] Field of Search ............ 74/89.15, 89.2, 479.89.21; 248/653, 654; 901/21, 23, 24, 28, 29; 414/680, 735

[56] References Cited

U.S. PATENT DOCUMENTS

| | | | |
|---|---|---|---|
| 1,624,098 | 4/1927 | Goldsmith et al. | 74/89.21 |
| 3,144,947 | 8/1964 | Pittwood | 214/1 |
| 3,784,031 | 1/1974 | Niitu et al. | 214/1 BC |
| 4,300,362 | 11/1981 | Lande et al. | 64/17 R |
| 4,407,625 | 10/1983 | Shum | 901/23 X |
| 4,435,116 | 3/1984 | Van Deberg | 414/728 |
| 4,442,046 | 4/1984 | Edmonston | 74/89.2 X |
| 4,595,334 | 6/1986 | Sharon | 414/735 |
| 4,666,362 | 5/1987 | Landsberger et al. | 901/21 X |
| 4,739,241 | 4/1988 | Vachtsevanos et al. | 901/29 |

FOREIGN PATENT DOCUMENTS

| | | | |
|---|---|---|---|
| 1083017 | 3/1984 | U.S.S.R. | 901/28 |
| 1256955 | 9/1986 | U.S.S.R. | 901/21 |
| 2083795 | 3/1982 | United Kingdom | 901/23 |

Primary Examiner—Allan D. Herrmann
Attorney, Agent, or Firm—William G. Auton; Donald J. Singer

[57] ABSTRACT

A six degree of freedom micromanipulator is disclosed which may be interposed between the fingers and the remainder of a robotic arm's structure for increasing the accuracy with which an arm's fingers may be positioned independently of the accuracy achievable through motions originating at or near the arm's shoulder. Included in the structure are a base plate and yokes; drive rods and trunnions; drive rod ends; and a manipulator plate and yokes. Motor driven push-pull assemblies may be used in place of the elongated drive rods and their associated trunnions to electrically control the position of the manipulator plate.

2 Claims, 6 Drawing Sheets

SIX DEGREES OF FREEDOM MICROMANIPULATOR

STATEMENT OF GOVERNMENT INTEREST

The invention described herein may be manufactured and used by or for the Government for governmental purposes without the payment of any royalty thereon

BACKGROUND OF THE INVENTION

The present invention relates generally to robot systems used for automated assembly, and more specifically to an adjustable micromanipulator that may be interposed between the fingers and the remainder of a robotic arm's structure for increasing the accuracy with which an arm's fingers may be positioned.

Mechanical devices capable of mimicking operations which may be performed by a human arm and hand, frequently referred to as "robotic arms" or "manipulators", are well known. Motion is frequently induced in a robotic arm by rotating it about a joint located near one of its ends which is commonly referred to as the arm's "shoulder." The other end of such a robotic arm, the end which translates when the arm rotates about its shoulder, is frequently referred to as its "hand". The parts of such hands which are used to grasp or manipulate an item are frequently referred to as its "fingers". To control the positioning of an arm's fingers, an arm generally includes other joints distributed along its length between its shoulder and its fingers which may provide either rotary or translational motion.

Such robotic arms are routinely capable of translating their hands throughout a relatively large volume, e.g. 1 cubic meter or more. However, within that large operating volume it is also frequently desirable to accurately position the hand's fingers, e.g. with a permissible error of much less than 1 mm. Because of the distance separating the location at which an arm's gross motions originate, i.e. its shoulder, and its fingers, minute errors at the source of such motion are magnified by the arm's length. Further, the elasticity of the arm's mechanisms and the arm's inherent flexibility introduce further static and dynamic errors in positioning its hands or fingers. In general, as the ratio of the range of an arm's gross motions to its finger position accuracy increases, it becomes progressively more and more difficult to accurately control the position of an arm's fingers. Inadequate finger position accuracy is obtained merely by controlling the arms movement about its shoulder or at other joints located near the shoulder.

The task of providing a means of adjusting the position of finger elements of robot arm systems is alleviated to some extent, by the systems of the following U.S. Patents, the disclosures of which are incorporated herein by reference:

U.S. Pat. No. 4,595,334 issued to Sharon;
U.S. Pat. No. 4,300,362 issued to Lande et al;
U.S. Pat. No. 4,435,116 issued to Van Deberg;
U.S. Pat. No. 3,784,031 issued to Niitu et al; and
U.S. Pat. No. 4,144,947 issued to Pittwood.

U.S. Pat. No. 4,595,334 discloses a robotic apparatus having five degrees of movement, and first, second, and third stage platforms to move and rotate the apparatus.

U.S. Pat. No. 4,300,362 discloses an articulation for a manipulator which includes two supporting elements interlinked by at least two connecting rods, the ends of which are coupled with the supporting elements by joints with two degrees of freedom.

U.S. Pat. Nos. 4,435,116, 3,784,031, and 3,144,947 each disclose a robotic manipulator for handling objects.

While the systems of the above-cited references are instructive, a need remains to provide a means for increasing the accuracy in which a robot arm's fingers may be positioned. The present invention is intended to satisfy that need.

SUMMARY OF THE INVENTION

The present invention is a micromanipulator assembly which may be interposed between a robot arm and the robot fingers of an automated system for increasing the accuracy with which the robot's fingers may be positioned independently of the accuracy achievable through motions originating at or near the arm's shoulder.

One embodiment of the micromanipulator assembly includes: a base plate and yokes; drive rods and nuts; trunnions and rod ends; and a manipulator plate and support yokes. Motor drive push-pull assemblies may be used in place of the elongated drive rods and their associated drive nuts to electrically control the position of the manipulator plate.

The base plate is a hexagonally shaped plate which is attached to the robot arm. Extending outward from the base plate's perimeter are six U-shaped, base plate yokes which are secured by a swivel joint to the base plate at the vertices of a regular hexagon lying in the plan of the base plate. Each of the six drive rods adjustably extend from a trunnion in one of the base plate yokes (about the perimeter of the base plate, to attachment points on the back of the manipulator plate, such that the manipulator plate may be adjustably positioned with six degrees of freedom as each of the driver rods, are extended).

When the finger elements of a robot system are attached to the manipulator plate (instead of direct attachment to the robot arm) the robot fingers may be positioned independently of the arm's accuracy. The arm's motion generally provides gross motion for the fingers, while the fingers are normally capable of a limited range of highly accurate movement. The micromanipulator assembly serves as a wrist between the robot arm and fingers, and provides intermediate range of adjustment for the finger positions.

It is an object of the present invention to provide a means for intermediate adjustment and positioning of the finger elements of a robot arm.

It is another object of the invention to allow a manner of adjustment of a robot's finger elements which is independent of the motions of the robot arm.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a micromanipulator assembly which may be used to position the finger elements of a robot system with six degrees of freedom of adjustment.

Figure 1:
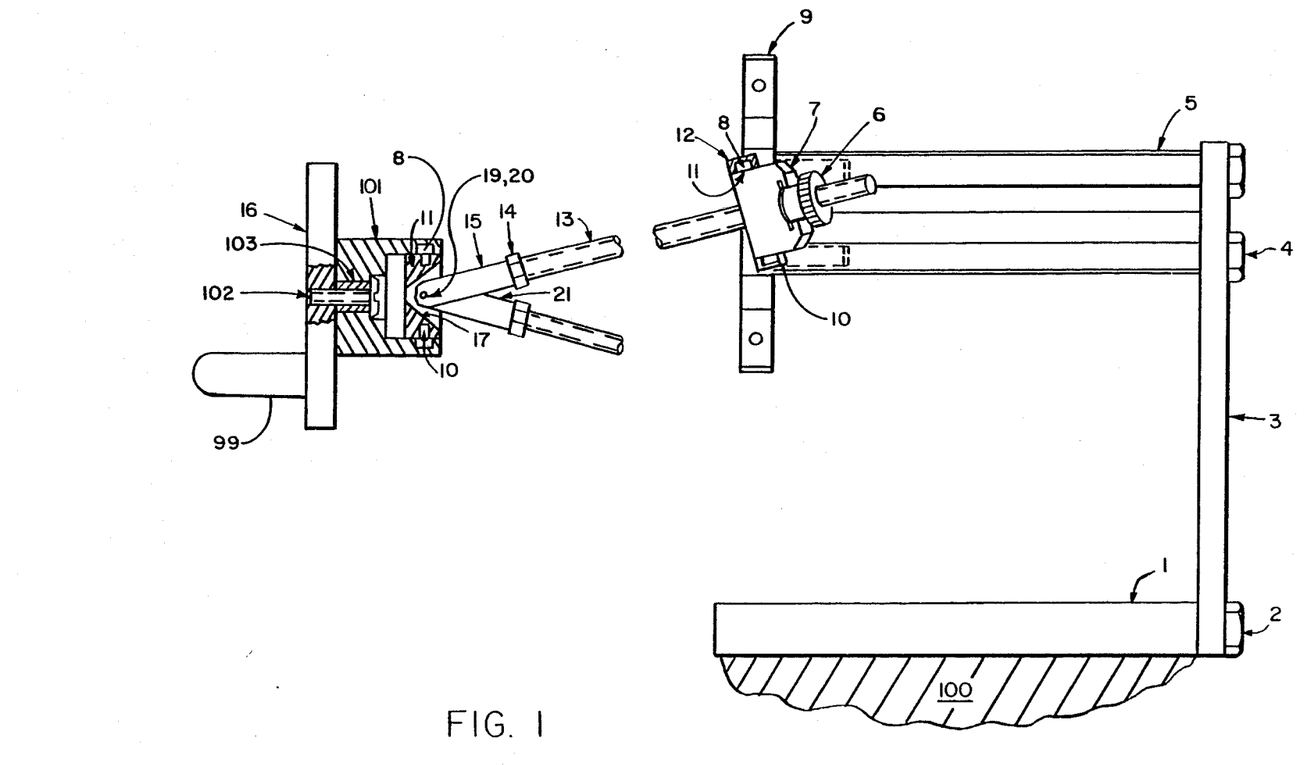
FIG. 1 is a side view of an embodiment of the invention.

The reader's attention is now directed towards FIG. 1, which is a sectional side view of an embodiment of the micromanipulator assembly of the present invention. The system of FIG. 1 includes: a base plate fixture 1-5, a hexagonally shaped, planar base plate 9; six base trunnions 7; six base plate yokes 12; six drive nuts 6; six elongated drive rods three drive rod eye ends 21; three drive rods fork ends 15; three driven trunnions 17; three manipulator plate yokes 101; and a manipulator plate 16.

The base plate fixture 1-5 provides a means of attaching the micromanipulator assembly to a robot arm 100 using a horizontal mounting plate 1, hexagonal screws 2, 4 and a vertical mounting plate 3. The horizontal mounting plate 1 may be fixed to the robot arm 100 (which moves to provide the large scale motions to the robot finger 99) attached to manipulator plate 16. The robot finger 99 attached to the manipulator plate 16 of FIG. 1 is schematically illustrated, and may be any piece of equipment that the robot arm needs to place in a certain position. An example of such a robot finger is the object manipulator finger device described in the above-cited Pittwood patent as element number 86. The first hexagonal screw 2 is used to attach the vertical mounting plate 3 to the horizontal mounting plate 1.

The vertical mounting plate 3 is attached by the second set of hexagonal screws 4 and long spacer 5 to a hexagonally shaped, planar base plate 9 which is adapted to be incorporated into a robotic arm near its hand. Extending outward from the base plate's perimeter six U-shaped, base plate yokes 12 which are secured to the base plate at the vertices of a regular hexagon lying in the plane of the base plate 9. Each base plate yoke 12 is secured to the base plate by a swivel joint 11. The swivel joint 11 is the point where the screws 8 and 10 protrude from the yoke 12 to the trunnion 7. This permits the trunnion 7 to swivel about the pivotal points of the attachment of screws 8 and 10 (as shown more clearly in FIG. 3). Each yoke carries a base trunnion 7, a drive nut 6, and a drive rod 13. The trunnion can rotate in two axes due to screws 8 and 10. Note that each of the above-described invention elements are depicted in subsequent figures. These figures will be described individually below.

As mentioned above, the hexagonal base plate 9 has six base plate yokes 12 evenly distributed about its perimeter. Attached to each of these yokes 12, via a trunnion 7, and a drive nut 6 is a threaded drive rod 13 which is used to tip and tilt the manipulator plate 16 with six degrees of freedom. When the robot finger element is fixed to the manipulator plate 16, it is also positioned with six degrees of freedom by the manipulator assembly.

For each pair of drive rods 13, the end of one drive rod furthest from the base plate, is rigidly sec red to a fork rod end 15 and the end of the other to an eye rod end 21. The two rod ends are joined together by a hinge pin 19 which also passes through the midpoint of a driven trunnion 17. This hinge pin 19 establishes the common point of the drive rod ends and also establishes an axis about which the rod ends rotate independently with respect to each other and with respect to the trunnion.

The driven trunnion 17 is itself supported between projecting arms of a U-shaped manipulator plate yoke 101, shaped similarly to the base plate yokes 12, by screws 8 located at each of its ends. The trunnion's axis of rotation, with respect to the manipulator plate yoke 101 established by these screws 8 and 10, is orthogonal to the axis of rotation of the drive rod ends 15 and 21 with respect to each other and to the trunnion 17.

Each of the three manipulator plate yokes 101 is attached by a screw 102 and a sleeve 103 to one surface of a planar, circular manipulator plate 16 near the manipulator plate's perimeter at the vertices of an equilateral triangle. The axes about which the rod ends 15 and 21, the trunnion 17 and yoke 101 rotate about each other are all orthogonal, and the yoke 101 swivels perpendicular to manipulator plate 16. When this micromanipulator is incorporated into a robotic arm, a finger of such a robotic arm may be secured to the surface of the manipulator plate 16 opposite to that to which the manipulator plate yokes 101 are secured.

Figure 2:
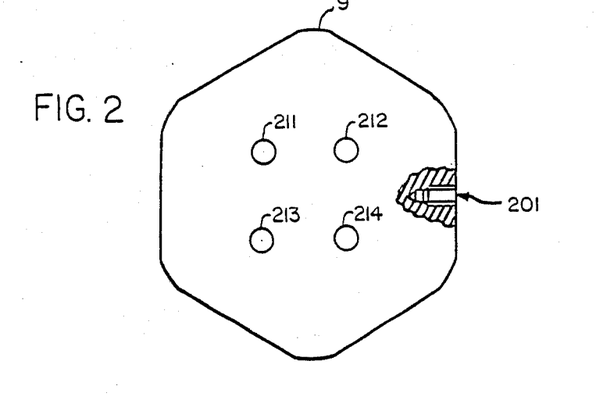
FIG. 2 is a front view of the base plate used in the system of FIG. 1.

FIG. 2 is a front view of the hexagonally shaped planar base plate 9 used in the system of FIG. 1. As mentioned above, six base plate yokes are fixed to the circumference of the base plate 9 with an even distribution between them. FIG. 2 has a sectional view of one of the six chambers 201 drilled into its perimeter, at which one of the six yokes are attached. Additionally, the base plate has four holes 211-214 which allow the second set of screws (4 of FIG. 1) to fix the base plate 9 to the vertical mounting plate 3.

Figure 3:
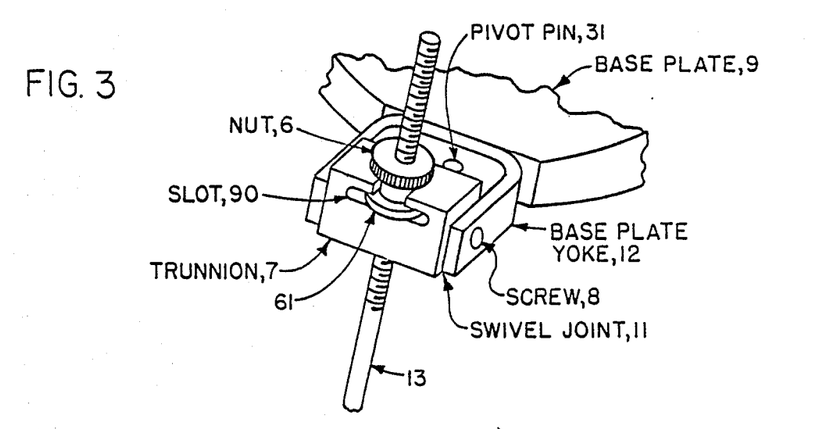
FIG. 3 is an illustration of a base plate yoke assembly used in the system of FIG. 1.

FIG. 3 is a detailed example of one of the six base plate yoke assemblies which position one of the six drive rods 13 in the system of FIG. 1. As mentioned above, there are six base plate yokes 12 evenly distributed about the circumference of the base plate 9.

Spanning between the projecting ends of each of the base plate yoke's two arms and secured there by screws 8 and 10, is a base trunnion 7. The trunnion is allowed to rotate about an axis which is orthogonal to the axis about which the base plate yoke itself rotates in relation to the base plate 9.

Figure 9:
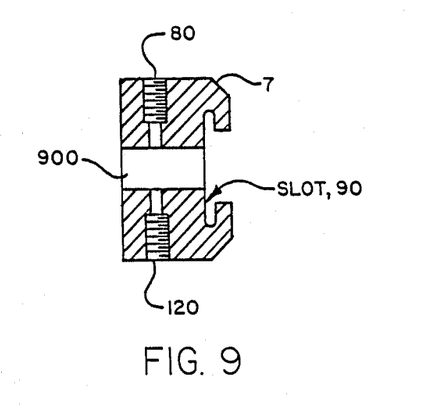
FIG. 9 is a sectional view of a base trunnion.

Passing through the midpoint of each base trunnion 7 is an elongated, longitudinally extensible manipulator drive rod 13. These six manipulator drive rods project outward from their respective attachment points at the base trunnions to form three pairs of adjacent rods at their ends projecting furthest from the base plate. In the invention depicted in FIGS. 1-3, each drive rod 13 consists of a threaded rod which may be extended outward from the trunnion 7 along the rod's length or retracted toward the trunnion by rotating a drive nut 6 which mates with the threaded rod and is coupled to the base trunnion. As shown in FIGS. 3 and 9, the trunnion 7 has a central slot 90 which allows the raised annular flange 61 of the knurled nut 6 to fit therein. This slot 90 allows the trunnion to be fixed in position by the knurled nut 6, as it is moved up and down the threaded drive rod 13. The isometric view of FIG. 3 shows how this slot 90 thereby allows the trunnion 7 to be coupled to the knurled nut 6. As the six drive rods of the system are positioned, they adjust the position of the manipulator plate 16 with six degrees of freedom. Note that the base plate yoke 12 is attached to the base plate by a pivot pin 31. This allows the base plate yoke to pivot as the nut 6 is adjusted.

Figure 4:
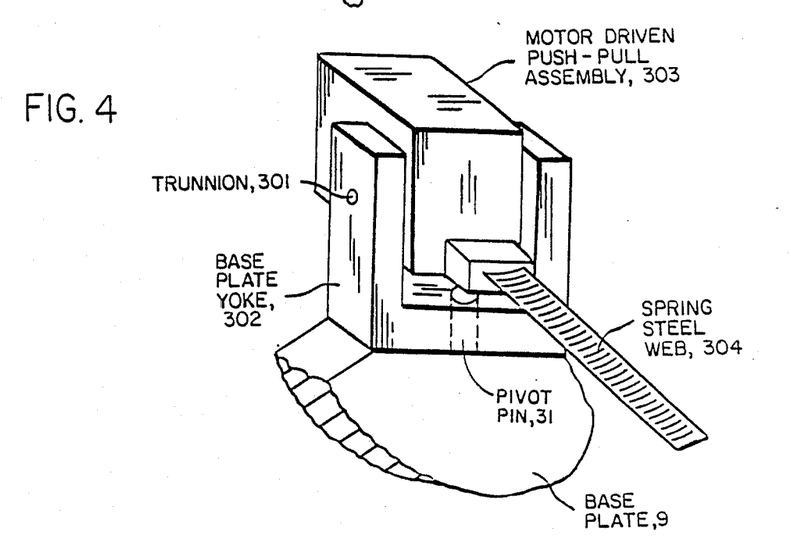
FIG. 4 is a push-pull assembly that may be used in the system of FIG. 1.

The preferred embodiment of the present invention employs six motor driven push-pull assemblies in place of the elongated drive rods and their associated base trunnions, which were depicted in FIG. 1. Each motor driven push-pull assembly, as illustrated in FIG. 4, is supported by pins 301 between the projecting arms of a base plate yoke 302 analogous to the base trunnions used in the system of FIG. 1. Each motor driven push-pull assembly also includes a coiled length of spring steel web 304 which forms a semicircular shaped trough when it is extended from the push-pull assembly similar to well known metallic measuring tapes. Thus, by energizing the motor driven push-pull assemblies 303, the length of the spring steel web 304 extending therefrom may be increased or decreased analogous to extending or retracting the length of the drive rod projecting outward from the base trunnions. Using such motor driven push-pull assemblies in place of the threaded drive rods provides a convenient means for electrically controlling the position of the manipulator plate which is compatible with digital computer control usually employed with robotic arms. Further, the use of such motor driven push-pull assemblies is compatible with comparatively high speed operation of the micromanipulator. Note that the base plate yoke 302 in FIG. 4 is connected to the base plate 9 by a pivot pin 31 which allows the base plate yoke 302 to be pivoted.

Figure 5:
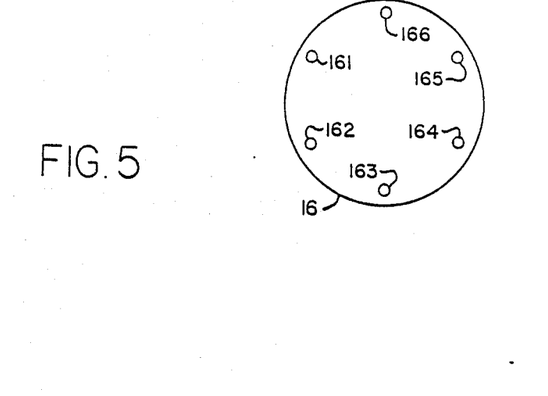
FIG. 5 is a front view of a manipulator plate.

FIG. 5 is a front view of the manipulator plate 16 used in the system of FIG. 1. As shown in FIG. 5, the manipulator plate has six holes 161–166 evenly distributed about its perimeter. Three of these holes allow the three manipulator yokes (which engage with the six drive rods) to be attached to the manipulator plate. The other three are for the attachment of the fingers on the other side of the plate.

As described thus far, the manipulator plate has been envisioned as the wrist of a robot arm which moves a robot's finger element. Examples of a robot arm include the above-cited patents and the Westinghouse series 5000 robot which is used in an automated assembly of electrical kits. Traditionally, such robot arms provide large-scale movements, while their associated finger elements provide small-scale movements with great precision. The wrist action of the manipulator plate serves to provide an intermediate range of movement to position finger elements of robots into desired locations.

Figure 6:
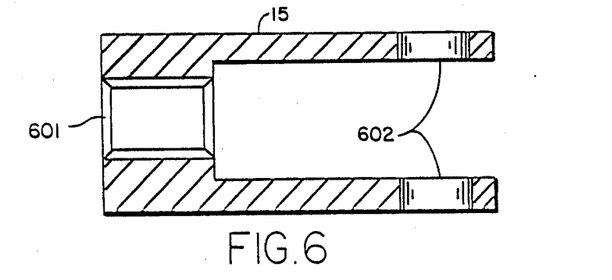
FIG. 6 is a sectional view of a fork rod end.

FIG. 6 is a sectional view of one of the three fork rod ends 15 used with the system of FIG. 1. A central hole 601 allows it to be attached to one of the six drive rods 13 of FIG. 1. The forked end of the rod end has a pair of coaxial holes 602 that allow the hinge pins 19 and 20 (depicted in FIG. 1) to be inserted.

Figure 7A:
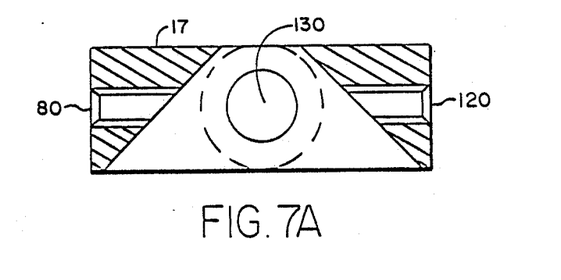
FIGS. 7a and 7b respectively depict plan and side views of a driven trunnion.
Figure 7B:
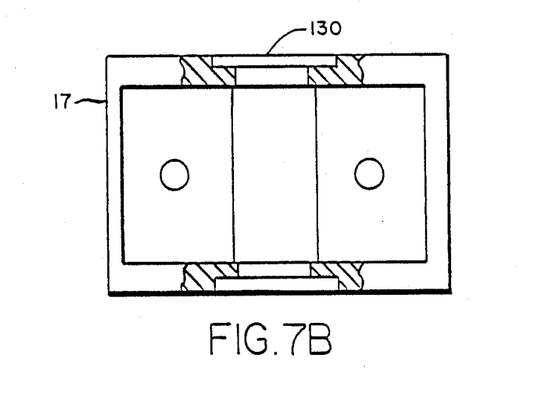

FIGS. 7a and 7b respectively depict the sectional and front views of the trunnion 17 which connects with the manipulator plate yoke 101 of FIGS. 1 and 5. As depicted in FIG. 1, each trunnion connects with a pair of elongated drive rods 13 using one fork rod end 15 and one eye rod end 21. Note that the sides of trunnion 17 have a pair of holes 120 and 80, which permit screws 8 and 10 access to pivotally fix the trunnion 17 to the yoke 101 as depicted in FIG. 1. The central yoke 130 permits the fork rod end 15 and the eye rod end 21 to be connected to the trunnion 17 as shown in FIG. 1.

Figure 8:
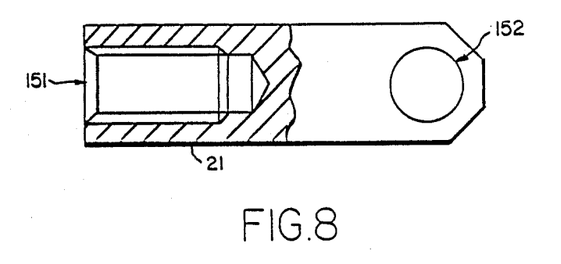
FIG. 8 is a side view of an eye rod end.

FIG. 8 is a sectional view of an eye rod end 21. A drilled hole 151 at one end engages with one of the drive rods. The hole 152 engages pivotally with the trunnion of FIGS. 7a and 7b.

FIG. 9 is a sectional view of a base trunnion 7. This trunnion has a pair of threaded side holes 80 and 120 that permit the screws 8 and 10 shown in FIG. 1 to pivotally attach it to the base plate yoke 12. The central hole 900 allows the elongated drive rod 13 (shown in FIG. 3) to pass through the trunnion 7 so that the nut 6 may position the trunnion 7 as follows. As shown in FIG. 3, the knurled nut 16 has: a narrow waist, a raised lower annular flange 61, and a raised upper annular edge. Both the raised upper annular edge and raised lower annular flange 61 have a slightly larger circumference than the narrow waist of the nut 6. As shown in FIG. 3, the raised lower annular flange 61 fits into the slot 90, so that as the knurled nut 6 is moved up and down the threaded drive rod 13, it positions the trunnion 7.

Figure 10:
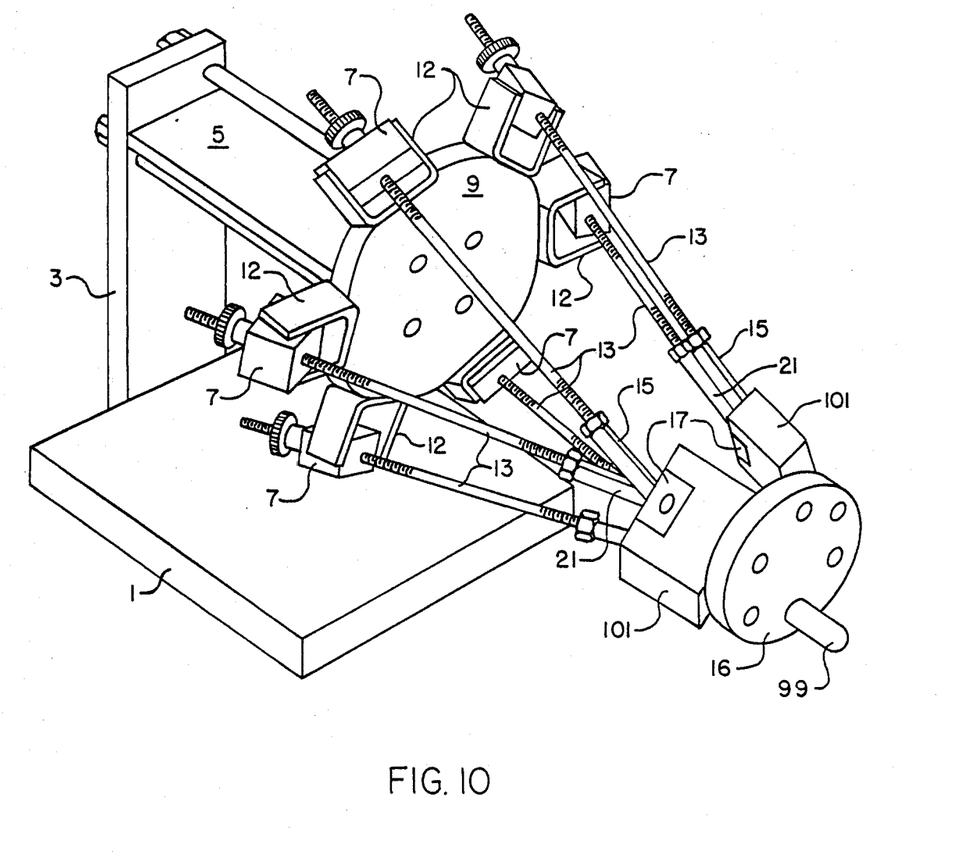
FIG. 10 is an isometric figure of the present invention.
Figure 11:
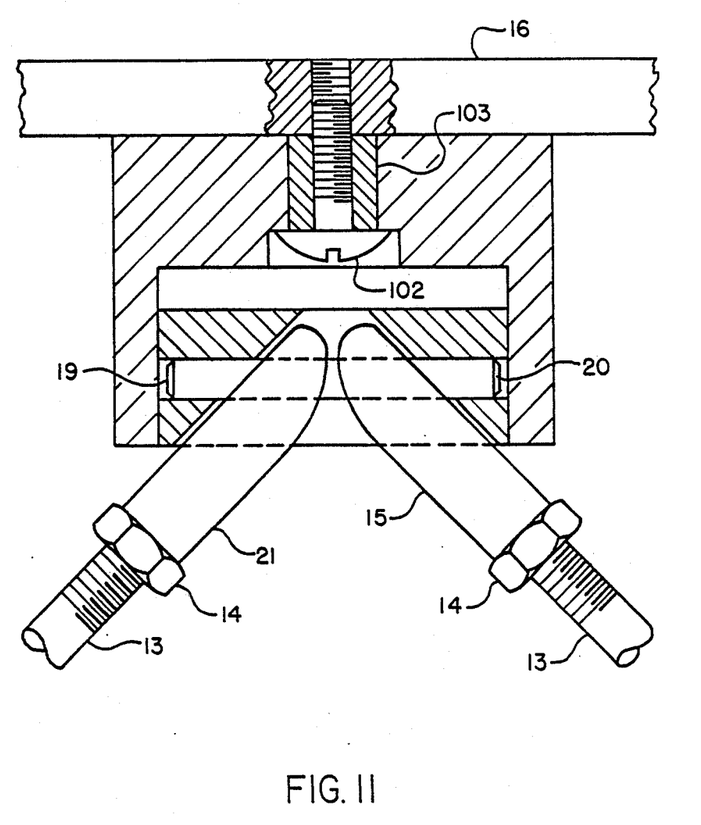
FIG. 11 is a plan view of a portion of FIG. 1.

FIG. 10 is an isometric figure of the present invention. The purpose of FIG. 10 is to show: the planar base plate 9, as it is carrying six yokes 12 and trunnions 7; which are in turn carrying six drive rods 13; which are in turn carrying three driven trunnions 17; and three manipulator plate yokes 101; which are in turn connected to a manipulator plate 16. FIG. 10 is intended to provide an overall view of the present invention whose details are provided in the Figures described above. FIG. 11 is a plan view of a portion of FIG. 1 showing the rod end 15, 21 connected to trunnion 17 and yoke 101.

The micromanipulator assembly of FIG. 1 supports the manipulator plate 16 at a distance from the base plate 9 through tensile and compressive forces in the elongated drive rods. Because the projecting ends of the drive rods are independently extendible away from or retractable towards the combined base trunnions and base plate yokes securing the drive rods to the base plate, extension or retraction of the drive rods constitutes three independent degrees of translation with respect to the base plate. The combined drive rod ends, base trunnions, and manipulator plate support yokes couple such translation of the drive rods to the manipulator plate so as to move it through six independent degrees of both translation and rotation with respect to the base plate. Thus, if the micromanipulator is incorporated in a robotic arm near its hand with the surface of the base plate furthest from the manipulator plate secured to the remainder of the arm and with a finger secured to the surface of the manipulator plate furthest from the base plate, the finger will be movable through all six degrees of freedom with respect to the remainder of the arm (three degrees of translation and three degrees of rotation) merely by appropriately extending or retracting the 6 elongated drive rods.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A micromanipulator assembly for use with a robot arm which moves a robot finger element with large scale motions, said robot finger element being moved with a small scale motions, said micromanipulator assembly being fixed between said robot arm and said robot finger element to move said robot finger elements with intermediate scale motions, said micromanipulator assembly comprising:

a planar base plate;

a means for attaching said planar base plate to said robot arm;

a plurality of base plate yokes which are fixed to and evenly distributed about the circumference of said planar base plate;

a plurality of drive rods, each of which are retractably fixed to one of said base plate yokes so that they may individually be extended and retracted with respect to said planar base plate;

a plurality of drive rod trunnions which are each pivotally connected to one of the base plate yokes about said planar base plate, each of said drive trunnions having a central aperture through which one of said drive rods extends; each of said drive rod trunnions also having a narrow slot which is perforated by said central aperture;

a plurality of manually rotated drive nuts, each of which are threaded and disposed to advance along one of said drive rods, each of said manually rotated rive nuts having a narrow waist, and a raised lower annular flange which fits in the narrow slot and one of said plurality of drive rod trunnions so that each of the manually rotated drive nuts are fixed to one of the drive rod trunnions, and will extend and retract its respective drive rod as it is rotated;

a manipulator plate which is fixed to said robot finger and said drive rods so that the robot finger may be positioned with multiple degrees of freedom as the manipulator plate is tipped and tilted into a desirable position by retracting and extending the drive rods;

a plurality of manipulator plate support yokes, each of which are attached to a side of said manipulator plate;

a plurality of coupling yoke trunnions each of which are pivotally attached to one of the manipulator plate yokes; and a plurality of rod ends, each of which are attached to one of the coupling yoke trunnions and two of said drive rods, said rod ends each allowing said manipulator plate to be tipped and tilted as its respective drive rods are retracted and elongated.

2. A micromanipulator assembly as defined in claim 1, wherein said planar base plate comprises a hexagonal plate which is connected to six drive rods by six base plate yokes and six drive rod trunnions, said micromanipulator assembly thereby being enabled to tip and tilt said robot finger element with six degrees of freedom.

* * * * *